US012786250B1

(12) United States Patent
Li et al.

(10) Patent No.: US 12,786,250 B1
(45) Date of Patent: Nov. 3, 2026

(54) NATIVE CLIENT TAKEOVER OF BROWSER-BASED COMMUNICATION SESSIONS

(71) Applicant: Zoom Video Communications, Inc., San Jose, CA (US)

(72) Inventors: Jin Li, Los Gatos, CA (US); Li Niu, Milpitas, CA (US)

(73) Assignee: Zoom Communications, Inc., San Jose, CA (US)

(*) Notice: Subject to any disclaimer, the term of this patent is extended or adjusted under 35 U.S.C. 154(b) by 36 days.

(21) Appl. No.: 18/784,002

(22) Filed: Jul. 25, 2024

(51) Int. Cl.
*H04L 65/1069* (2022.01)
*H04L 67/141* (2022.01)
*H04L 67/142* (2022.01)

(52) U.S. Cl.
CPC ........ *H04L 65/1069* (2013.01); *H04L 67/141* (2013.01); *H04L 67/142* (2013.01)

(58) Field of Classification Search
CPC . H04L 65/1069; H04L 67/141; H04L 67/142; H04L 12/18; H04L 12/181; H04L 12/189; H04L 12/1831; H04L 12/1813; H04L 29/08306; H04L 12/1822; H04L 12/1827; H04L 65/401; H04L 65/403; H04L 29/06414; H04L 65/1066; H04N 7/15; H04N 21/6181; H04M 3/56
See application file for complete search history.

(56) References Cited

U.S. PATENT DOCUMENTS

| | | | | |
|---|---|---|---|---|
| 7,181,492 | B2 * | 2/2007 | Wen | H04L 12/1827 709/204 |
| 8,214,494 | B1 * | 7/2012 | Slavin | H04L 12/2823 709/224 |
| 9,053,340 | B2 * | 6/2015 | Borzycki | G06F 21/6218 |
| 9,225,711 | B1 * | 12/2015 | Sorensen | H04L 63/0815 |
| 9,280,677 | B1 * | 3/2016 | Perry | H04L 67/10 |
| 9,892,190 | B1 * | 2/2018 | Kirazci | G06F 16/9535 |
| 10,554,820 | B2 * | 2/2020 | Hassan | H04M 3/5116 |
| 10,637,901 | B2 * | 4/2020 | Sebastian | H04L 12/18 |
| 10,853,628 | B2 * | 12/2020 | Hassan | G06V 40/172 |
| 10,958,702 | B1 * | 3/2021 | Yang | H04L 65/752 |
| 11,212,324 | B2 * | 12/2021 | Niemi | H04W 48/18 |

(Continued)

*Primary Examiner* — Michael Won

(74) *Attorney, Agent, or Firm* — Kilpatrick Townsend & Stockton LLP

(57) ABSTRACT

Example systems and methods for native client takeover of browser-based communication sessions are provided. A client device establishes a first communication session between a third-party provider and a user associated with the client device via a browser-based application associated with the third-party provider. The browser-based application is developed by a communication platform. The client device receives a request to establish a second communication session between the user and the third-party provider. In response to receiving the request to establish the second communication session, the client device detects that a native communication application provided by the communication platform is installed on the client device. The client device provides a recommendation to establish the second communication session on the native communication application. In response to receiving a selection of the recommendation, the client device establishes the second communication session via the native communication application.

20 Claims, 7 Drawing Sheets

(56) References Cited

U.S. PATENT DOCUMENTS

| | | | | |
|---|---|---|---|---|
| 11,375,345 | B2 * | 6/2022 | Peterson | H04W 4/14 |
| 11,500,850 | B1 * | 11/2022 | Jonik | G06F 16/2365 |
| 11,562,657 | B1 * | 1/2023 | Fieldman | G09B 5/14 |
| 12,026,517 | B2 * | 7/2024 | Byrne | G06F 9/54 |
| 12,452,093 | B2 * | 10/2025 | Hassan | H04L 12/1818 |
| 2003/0091023 | A1 * | 5/2003 | Gambino | H04L 63/04 370/351 |
| 2007/0264985 | A1 * | 11/2007 | Kapur | G06F 8/38 455/414.1 |
| 2008/0086564 | A1 * | 4/2008 | Putman | H04L 67/02 709/227 |
| 2014/0044249 | A1 * | 2/2014 | Brittain | H04L 65/1069 379/204.01 |
| 2015/0234645 | A1 * | 8/2015 | Ramachandran | G06F 9/445 707/766 |
| 2017/0264592 | A1 * | 9/2017 | Yoda | H04L 63/0876 |
| 2018/0129510 | A1 * | 5/2018 | Zhang | G06F 3/1423 |
| 2019/0245895 | A1 * | 8/2019 | Balasaygun | H04L 65/1104 |
| 2020/0053133 | A1 * | 2/2020 | Atarius | H04L 69/164 |
| 2020/0153719 | A1 * | 5/2020 | Chauhan | H04L 41/0894 |
| 2021/0044630 | A1 * | 2/2021 | Gutta | H04L 65/60 |
| 2021/0385292 | A1 * | 12/2021 | Lowe | H04L 63/08 |
| 2022/0116345 | A1 * | 4/2022 | Xu | H04L 67/141 |
| 2022/0210514 | A1 * | 6/2022 | McBeth | H04N 21/44226 |
| 2022/0239698 | A1 * | 7/2022 | Anantharaju | H04L 63/105 |
| 2022/0239785 | A1 * | 7/2022 | Daniel Marcelino Barbeira | H04W 12/35 |
| 2023/0254353 | A1 * | 8/2023 | Shankar | H04L 65/1069 709/204 |
| 2024/0103990 | A1 * | 3/2024 | Nadarajan | G06F 16/986 |
| 2025/0267139 | A1 * | 8/2025 | Akkarakaran Jose | H04L 63/0807 |
| 2025/0267140 | A1 * | 8/2025 | Akkarakaran Jose | H04L 63/1466 |
| 2025/0286745 | A1 * | 9/2025 | Hassan | H04L 12/1818 |

* cited by examiner

NATIVE CLIENT TAKEOVER OF BROWSER-BASED COMMUNICATION SESSIONS

FIELD

The present application generally relates to virtual conferencing and more specifically relates to native client takeover of browser-based communication sessions.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
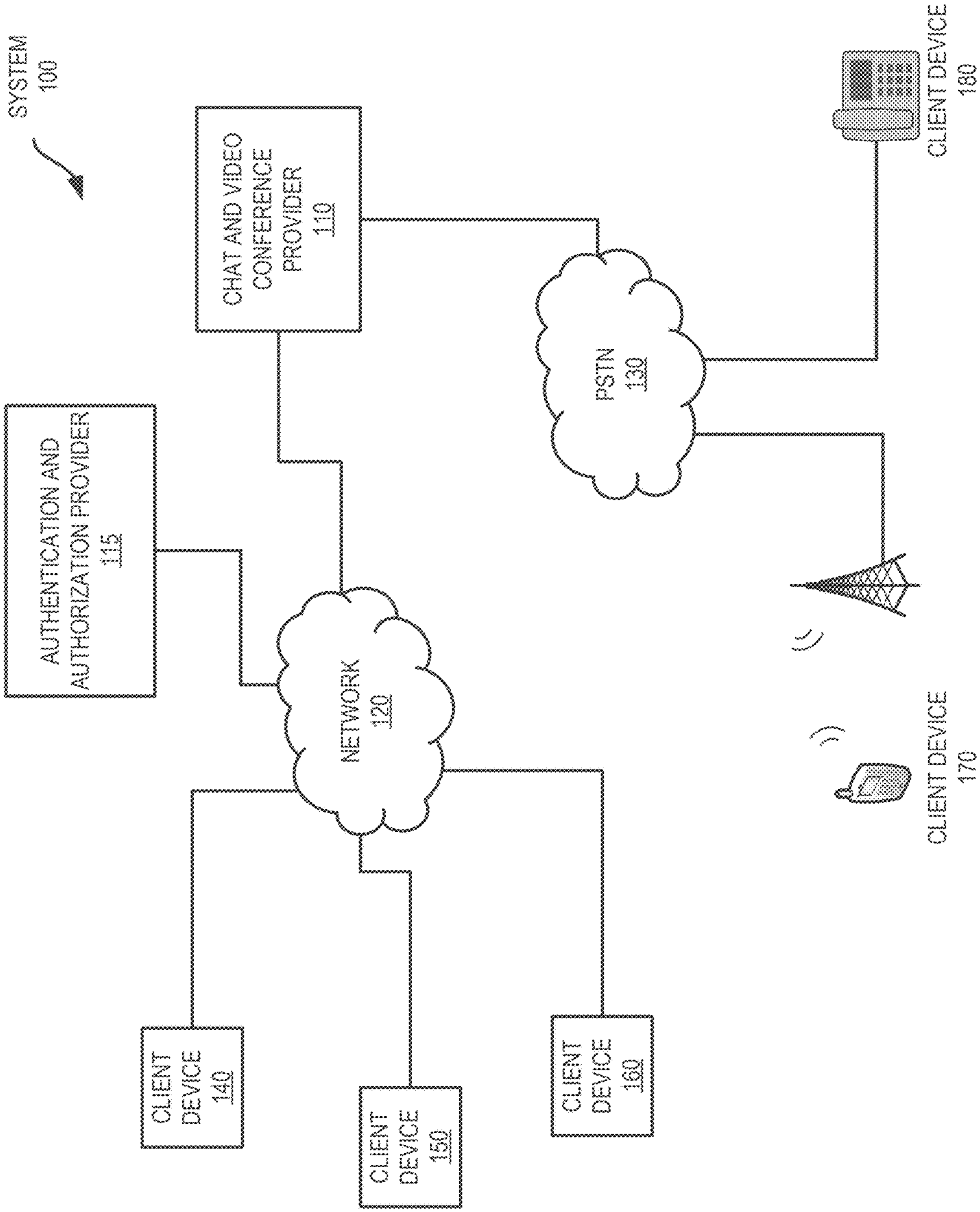
FIG. 1 shows an example system that provides chat and videoconferencing functionalities to various client devices.

Examples are described herein in the context of native client takeover of browser-based communication sessions. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Various third-party providers, which provide products or services to customers, often include contact centers to provide customer service via chat, phone calls, or video conferences. A customer user usually goes to a website of a third-party provider to start a chat or video conference with a service representative. Browser-based communication applications at these contact centers are usually developed by the third-party provider to include a software development kit (SDK) provided by a communication provider for certain communication functionalities. However, browser-based communication applications have limitations compared to native communication applications installed on a client device. For example, browser-based communication applications may not support remote control or annotations. In addition, audio and video qualities of the browser-based communication applications are not as good as those provided by native communication applications.

To enhance communication with a user efficiently and effectively, it is desirable for a client device to detect and launch a native communication application on a client device and migrate browser-based communications to the native communication application.

In an example, a user initiates a first communication session with customer service on a website of a third-party provider. The website includes a browser-based application. The browser-based application can include an SDK provided by the communication platform to provide one or more communication functionalities, such as chat, phone calls, and video conferences. For example, the browser-based application includes a chat box, and the user can type in a chat message to the chat box to start a chat session with the customer service of the third-party provider.

During the chat session, the user or the customer service may initiate a video conference session. For example, the customer service provides a link or a GUI button associated with a virtual conference room. The link or the GUI button can include information about a native communication application that can handle the video conference session. The user can click the link or the GUI button to join a video conference. The link or the GUI button includes a customized connection protocol for establishing the video conference. The clicking triggers a native client detection tool in the browser-based application to detect if a native communication application provided by the same communication provider is installed on the client device associated with the user. In some examples, the native client detection tool can access a registry database on the client device. The registry database stores registration keys for installed applications. The native client detection tool can search for registry keys in the registry database that match information included in the link or GUI button.

If a native communication application is installed and detected, the browser-based application can generate a popup message to ask if the user wants to join the virtual conference via the native communication application. If the user selects "yes," the client device launches the native communication application for establishing the virtual conference. If the user selects "no," the browser-based communication application establishes the virtual conference in a default browser on the client device.

If the native communication application is not detected, the browser-based application can generate a popup message to ask if the user wants to install the native communication application so that the user can join the virtual conference via the native communication application. If the user selects to install the native communication application, the native communication application can be downloaded and installed on the client device, and then launched to establish the virtual conference. If the user selects not to install the native communication application, the virtual conference can be established on the default browser of the client device.

Thus, the example browser-based communication application can detect and launch a native communication application to facilitate communications between a user and a customer service associated with a third-party provider. The native communication application enhances the communication with additional functionalities, such as remote control of client device or annotation tools for collaboration. In addition, the native communication application provides better audio and video qualities than the browser-based application.

This illustrative example is given to introduce the reader to the general subject matter discussed herein and the disclosure is not limited to this example. The following sections describe various additional non-limiting examples and examples of native client takeover of browser-based communication sessions.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
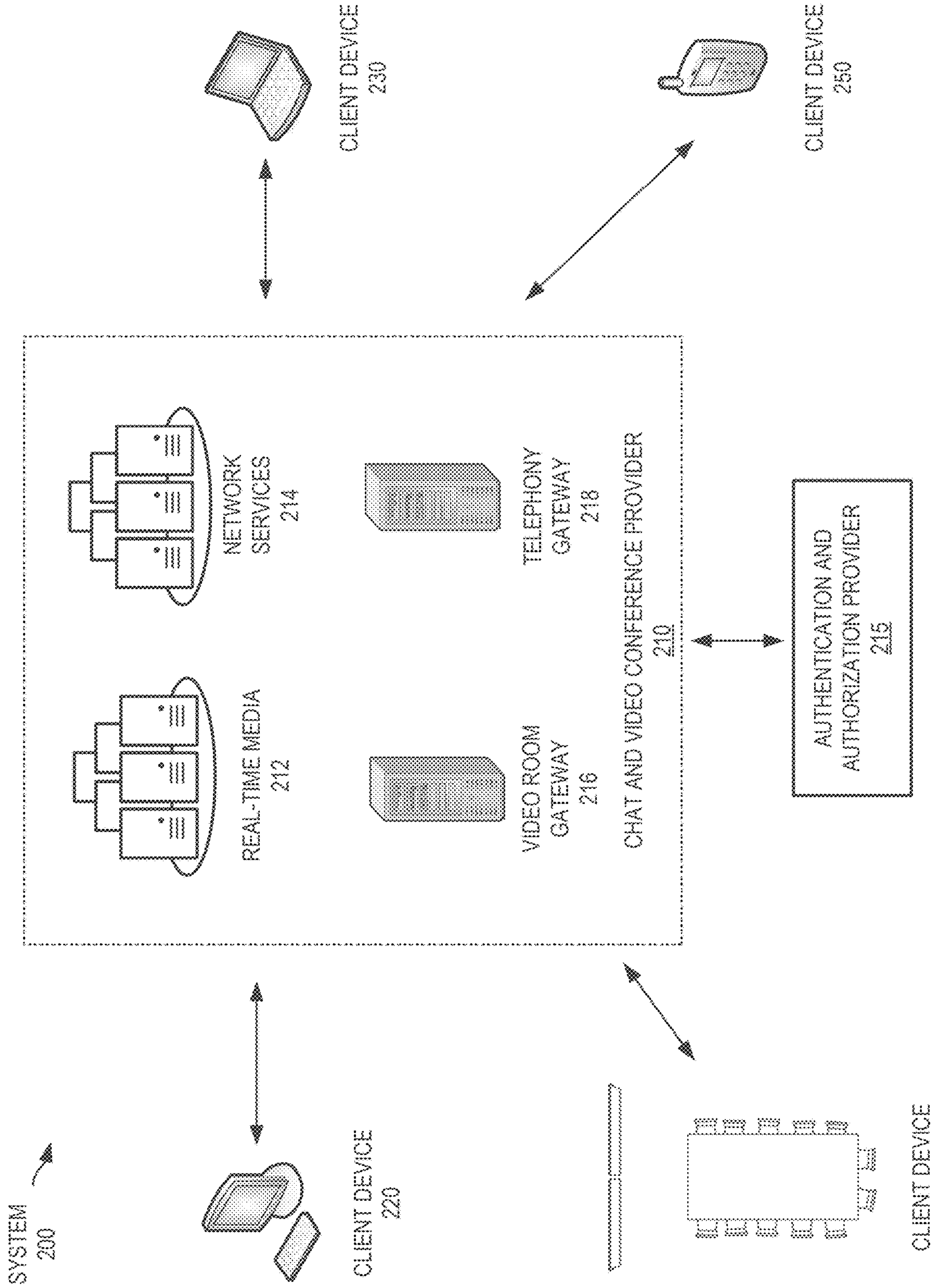
FIG. 2 shows an example system in which a chat and video conference provider provides chat and videoconferencing functionalities to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-

250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
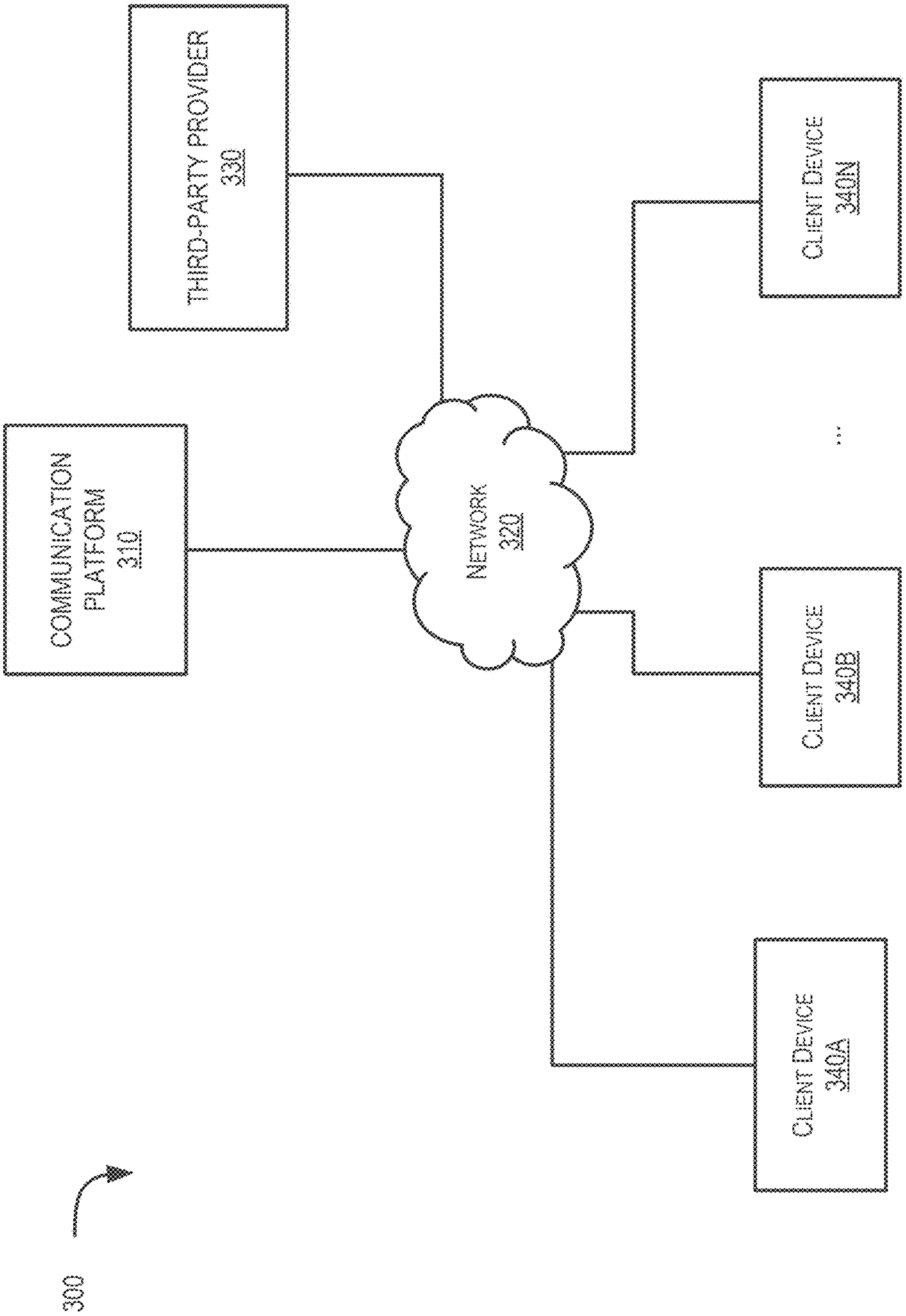
FIG. 3 shows an example system that can establish a virtual communication session.

Referring now to FIG. 3, FIG. 3 shows an example system 300 that can establish a virtual communication session. In this example system 300, a communication platform 310, a third-party provider 330, and a number of client device 340A-340N (which may be referred to herein individually as a client device 340 or collectively as the client devices 340) are connected via a network 320. The communication platform 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these. The third-party provider 330 can be associated with a business or enterprise offering products or services to customers. The third-party provider 330 can include one or more server computers, on-premises or cloud-based. The third-party provider 330 can include a website for users to communicate with the server or certain personnel associated with the third-party provider 330, The website can include a browser-based application for users to communicate with the customer service or contact center of the third-party provider 330.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the communication platform 310 using the internet or other suitable computer network. The client devices 340 have communication software installed to enable them to connect to the communication platform 310 for chats, video conferences, emails, and any other suitable communications. For example, during a video conference session, a user associated with a client device (e.g., client device 340A) can interact with other users associated with other client devices (e.g., client device 340B-340N) via the communication platform 310 by video and audio streams. The client device 340 can also access the website associated with the third-party provider 330, and communicate with certain personnel (e.g., customer service) associated with the third-party provider 330 via a browser-based application on the website.

Figure 4:
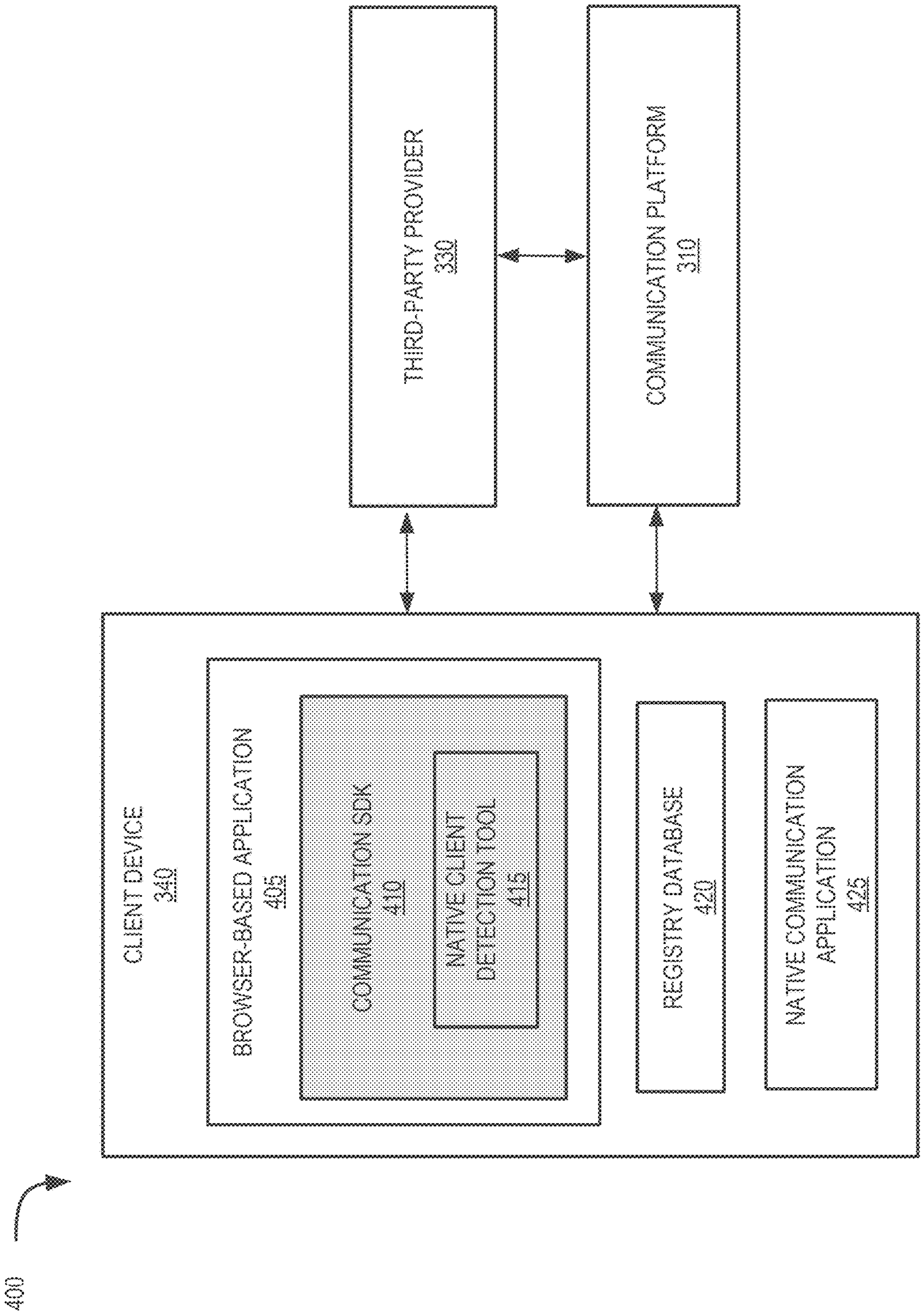
FIG. 4 shows an example system that is configured for detecting and launching a native communication application for taking over communication over a browser-based application.

Now referring to FIG. 4, FIG. 4 shows an example system 400 that is configured for detecting and launching a native communication application for taking over communication over a browser-based application. A client device 340 is in network communication with a third-party provider 330 via a browser-based application 405. The client device 340 may also be installed with a native communication application 425 provided by the communication platform 310.

The browser-based application 405 can include communication SDK 410 provided by the communication platform 310 to provide various communication channels for a user, such as chat, phone calls, video conferencing. The communication SDK 410 can also include a native client detection tool 415. The native client detection tool can be a software module. For example, the native client detection tool 415 is created as a command line program in the execution environment for the browser-based application 405 on a server of the third-party provider 330. The native client detection tool 415 is configured to detect if a native communication application 425 provided by the same communication platform 310 as the communication SDK 410 included in the browser-based application 405. The communication SDK 410 or the native client detection tool can be embedded with a connection protocol customized for detecting and launching the native communication application 425 provided by the communication platform 310 to perform certain functionalities, such as establishing a video conference.

In some examples, a user initiates a communication session (e.g., a chat session) via the browser-based application 405 on a website of the third-party provider 330. During the communication session, the browser-based application 405 provides a URL link or a GUI button for a user to join a virtual conference. The URL link is associated with the third-party provider 330 and may not identify the communication platform 310. The URL link can include information indicating establishing a video conference. Similarly, the GUI button can include information about establishing the virtual conference. When the user clicks the URL link or the GUI button to join a video conference, it generates a triggering signal. The triggering signal can include the customized connection protocol related to a native client application for establishing the video conference. The triggering signal triggers the native client detection tool 415 to detect if the client device 340 is installed with the native client application that can handle the customized protocol. Such native client application is usually a native communication application 425 provided by the same communication platform 310 as the communication SDK 410.

To determine if a native client application is available, the native client detection tool 415 can access a registry database 420 on the client device 340. The registry database 420 stores registration keys for installed applications. A registration key can include a connection protocol that the corresponding client application handles. The native client detection tool 415 can search for registry keys in the registry database 420 that handle the customized protocol included in the link or GUI button. If a native communication application 425 is detected, the browser-based application 405 provides a message to ask if the user wants to join the virtual conference via the native communication application 425. If the user selects to join the virtual conference via the native communication application 425, the client device 340 launches the native communication application 425 for establishing the virtual conference. If the user selects not to join the virtual conference via the native communication application 425 but to stay on the website, the browser-based application 405 establishes the virtual conference using the communication SDK 410.

If the native client detection tool 415 does not detect the native communication application, the browser-based application 405 may provide a message to ask if the user wants to install a native communication application so that the user can join the virtual conference via the native communication application. If the user selects to install the native communication application, the client device 340 can download and install the native communication application, and then launch the native communication application to establish the virtual conference. If the user selects not to install the native communication application, the browser-based application 405 establishes the virtual conference using the communication SDK 410.

The native communication application 425 provides chat functionality, video conferencing functionality, whiteboard, and other suitable functionalities that the browser-based application 405 provides via the communication SDK 410. Certain functionalities on the native communication application 425 may have higher quality, for example the video and audio quality on the native communication application 425 is better than that on the browser-based application 405. In addition, the native communication application 425 also includes certain functionalities that the browser-based application 405 does not provide. For example, the native communication application 425 includes a remote control functionality that enables a user to remotely access of another user's client device in a communication session. For example, a customer service representative of a third-party provider 330 can remotely access a user's client device 340 to troubleshoot a problem associated with an application installed on the client device 340, associated with some functionalities of the client device 340 itself.

Figure 5:
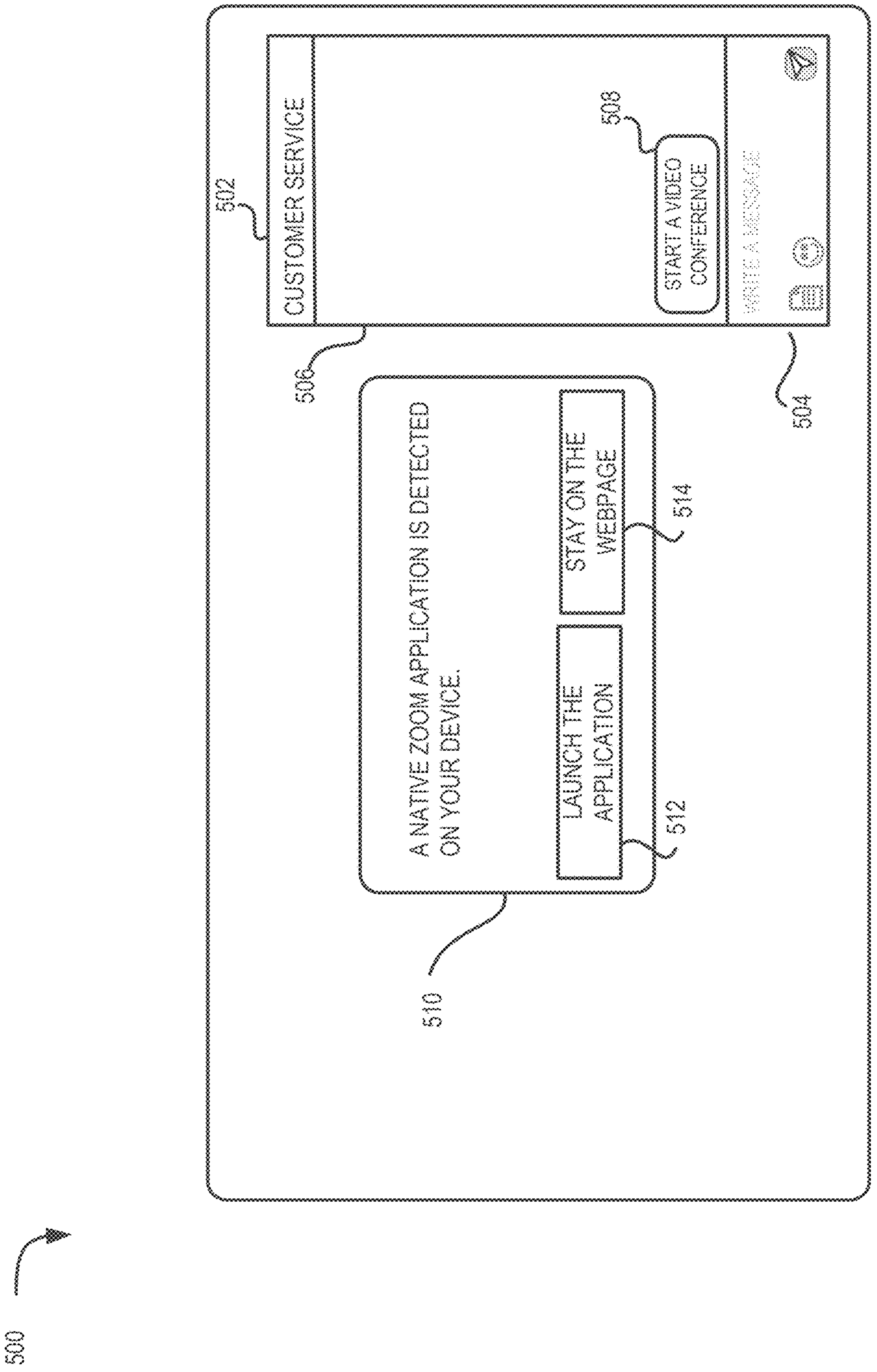
FIG. 5 shows an example GUI of a browser-based application associated with a third-party provider.

Referring now to FIG. 5, FIG. 5 shows an example GUI 500 of a browser-based application associated with a third-party provider 330. The example GUI 500 includes a communication window 502 for a user to communication with customer service. The communication window 502 is associated with a browser-based application provided by a website associated with a third-party provider 330. The browser-based application includes certain communication functionalities enabled by a communication SDK provided by a communication platform, for example a Zoom® platform. The communication window 502 can include a chat input box 504, where a user can type a chat message to start a chat session with customer service. The communication window 502 also includes a chat box 506 to display chat messages between a user and the customer service. The communication window 502 also includes a GUI button 508 for starting a video conference. If a user clicks or touches the GUI button 508, the user initiates a video conference with customer service. Alternatively, customer service can provide a video conference link in the chat box 506 for a user to click and join the video conference. If a native communication application provided by the same communication platform as the communication SDK in the browser-based application, for example the Zoom platform, is detected, a popup window 510 can be displayed over the example GUI 500 with a message that "a native Zoom application is detected on your device." The popup window 510 also includes a button 512 for the user to select to launch the application for joining the video conference. The popup window 510 also includes a button 514 for the user to select to stay on the webpage for joining the video conference. If the native communication application is not detected, an alternative popup window (not shown) can be displayed over the example GUI 500. The alternative popup window can include a message that "a native Zoom application is not detected on your device." The alternative popup window can include a button for the user to select to download and launch the application for joining the video conference. The alternative popup window can also include a button for the user to select to stay on the webpage for joining the video conference.

Figure 6:
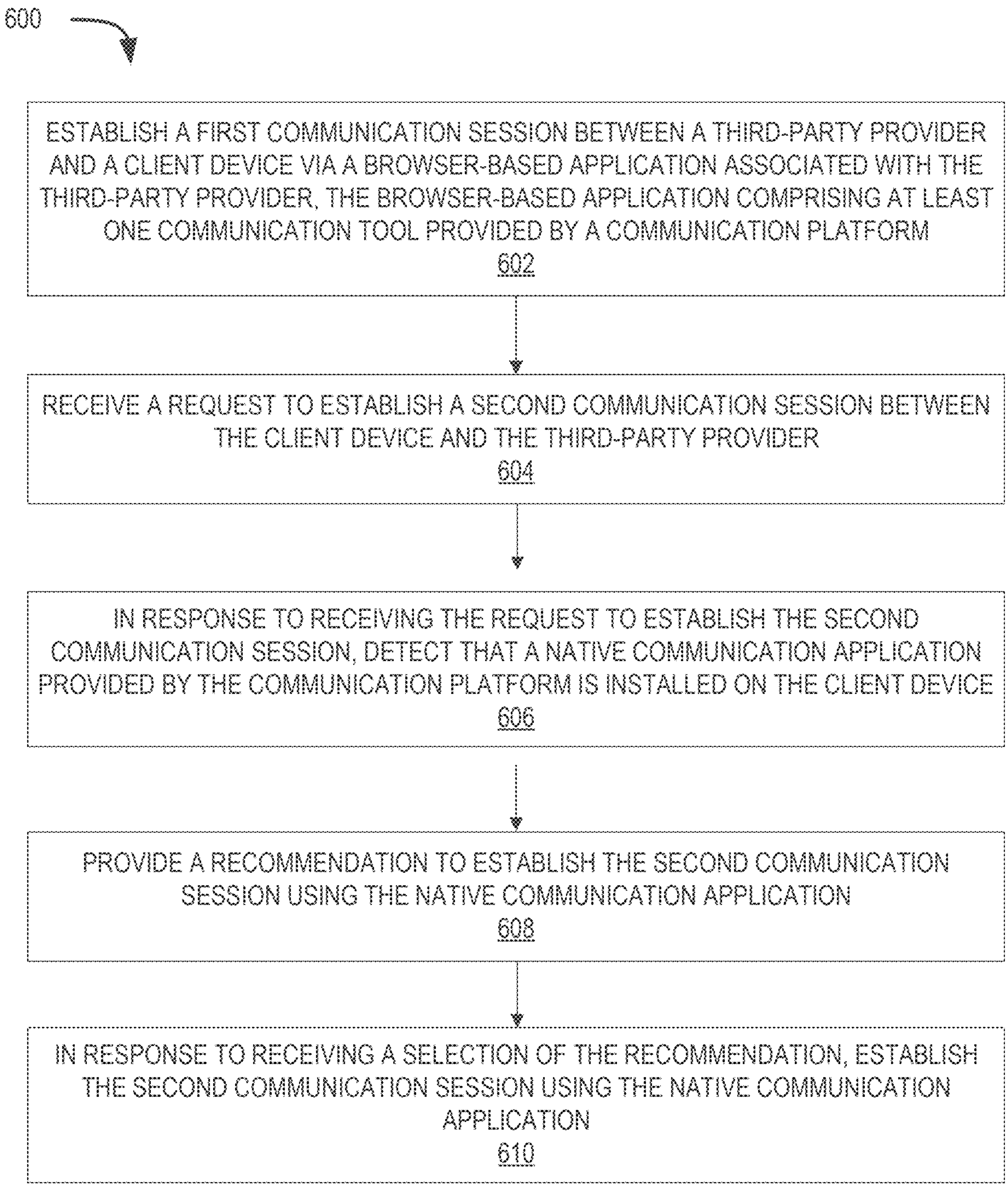
FIG. 6 shows an example method for native client takeover of browser-based communication sessions.

Referring now to FIG. 6, FIG. 6 shows an example method 600 for native client takeover of browser-based communication sessions. The example method 600 will be discussed with respect to the system 400 shown in FIG. 4; however, any suitable system for native client takeover of browser-based communication sessions may be used.

At block 602, a client device 340 establishes a first communication session between a third-party provider 330 and the client device 340 via a browser-based application 405 associated with the third-party provider 330. The browser-based application 405 can include at least one communication tool developed by communication platform 310. For example, the at least one communication tool includes a communication SDK 410 provided by the communication platform 310.

The communication SDK 410 can provide one or more communication functionalities, such as chat, phone calls, and video conferences.

At block 604, the client device 340 receives a request to establish a second communication session between the client device 340 and the third-party provider 330. The browser-based application 405 on the client device 340 can receive the request from an input device (e.g., keyboard, mouse, touchscreen) associated with the client device 340. In some examples, a user associated with the client device 340 sends a request to establish a second communication session via the input device associated with the client device 340. In some examples, the third-party provider 330 suggests establishing a second communication session with the user. The second communication session can be a different type from the first communication session on the browser-based application. For example, the first communication session is a chat session, and the second communication session is a video conference. The browser-based application 405 can provide a URL link or a GUI button for establishing the second communication session, for example a video conference, for a user to request to establish a second communication session by clicking or touching the URL link or the GUI button. Alternatively, or additionally, the first communication session and the second communication session are the same type of communication sessions. For example, the first communication session is a video conference on the browser-based application, the request for establishing the second communication session includes establishing a video conference on a native communication application, by clicking or touching a related URL link or GUI button.

At block 606, the client device 340 detects that a native communication application 425 provided by the communication platform 310 is installed on the client device 340 in response to receiving the request for establishing the second communication session. The native client detection tool 415 of the browser-based application 405 can detect if a native communication application 425 provided by the communication platform 310 is installed on the client device 340, generally as described in FIG. 4. For example, the URL link or a GUI button for requesting to establish a second communication session can include a customized connection protocol for the second communication session. The native client detection tool 415 can access a registry database 420 on the client device 340 to search for a registry key corresponding to a native client application that can handle the customized connection protocol included in the link or GUI button. The registry key includes a connection protocol that the corresponding native client application handles. If the connection protocol in the registry key matches the customized connection protocol in the URL link or the GUI button, the corresponding native client application is detected to be the native communication application 425 provided by the same communication platform 310 as the communication SDK 410 in the browser-based application 405.

At block 608, the client device 340 provides a recommendation to establish a second communication session using the native communication application. If the native communication application is detected, as described at block 606, the client device 340 provides a recommendation in an interactive GUI element, for example a popup window, via a GUI of the browser-based application 405. The interactive GUI element can include a button for launching the native communication application for establishing the second communication session, and a button for staying on the browser-based application for establishing the second communication session. In some examples, the native communication application is not detected on the client device 340, the client device 340 provides an alternative recommendation in an interactive GUI element. The interactive GUI element can include a button for downloading and launching the native communication application for establishing the second communication session, and a button for staying on the browser-based application for establishing the second communication session.

At block 610, the client device 340, in response to receiving a selection of the recommendation, establishes the second communication session using the native communication application. If the native communication application 425 is detected and the user selects to establish the second communication session on the native communication application 425, the client device can launch the native communication application 425 and establish the second communication session on the native communication application 425. If the first communication session is different from the second communication session, for example the first communication session is a chat session and the second communication session is a video conference, the first communication session can stay on the browser-based application 405 while the second communication session is established on the native communication application 425. Alternatively, or additionally, the first communication session (e.g., the chat session) can be migrated to the native communication application 425. If the first communication session and the second communication session are of the same type, for example both are video conferences, the first communication session can be terminated when the second communication session is established on the native communication application 425.

In some examples, communication data associated with the first communication session can be provided to participants of the second communication session established on the native communication application 425. In some examples, the communication SDK 410 includes, uses, or implements a generative artificial intelligence (AI) model to generate a summary of the communication data associated with the first communication session and provide to the participants of the second communication session. For example, the first communication session is a chat session between a user and a first person associated with the third-party provider 330, and the second communication session is a video conference session between the user and a second person related to the third-party provider 330. The second person can be the same as or different from the first person associated with the third-party provider. The communication SDK 410 can generate a chat summary of the chat session to the participants of the video conference session. If the second person associated with the third-party provider 330 in the video conference session is different from the first user in the chat session, the summary of the chat session provides the second person information so that the second person can make the customer experience smooth for the user.

In some examples, the native communication application 425 is not detected and the user selects to download the native communication application for establishing the second communication session, the client device 340 downloads and launches the native communication application 425 and establish the second communication session on the native communication application 425. In some examples, no matter the native communication application is installed on the client device 340 or not, the user selects to stay on the browser-based application 405, the client device 340 then establishes the second communication session on the browser-based application 405.

The example method 600 illustrates a method for native client takeover of browser-based communication sessions. However, not every step in the example method 600 may be needed, or some steps may be in a different order. The example method 600 is performed by a client device 340. Alternatively, the example method 600 can be performed by the third-party provider 330 or a communication platform 310.

Figure 7:
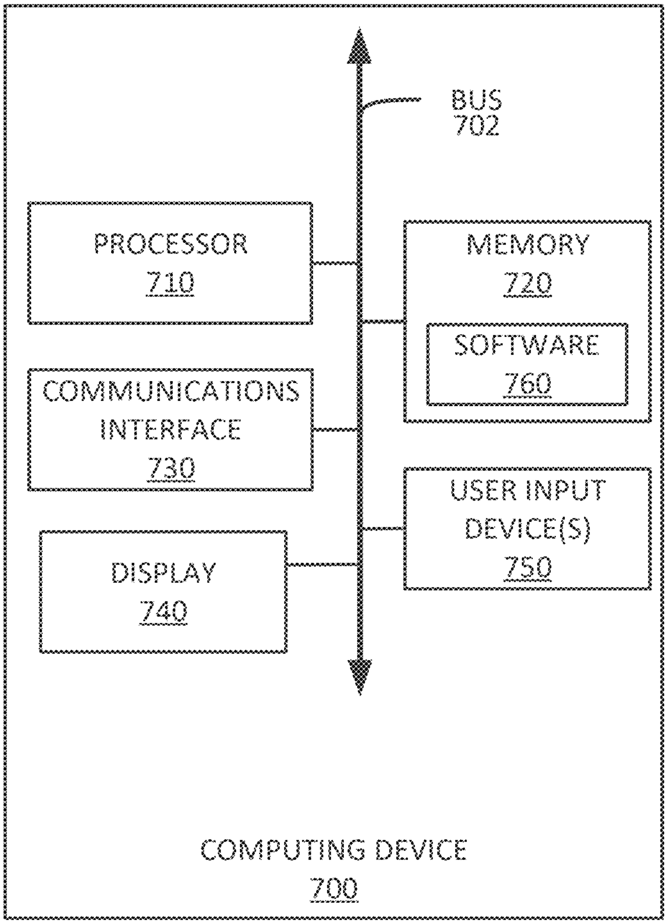
FIG. 7 shows an example computing device suitable for use in example systems or methods for native client takeover of browser-based communication sessions according to this disclosure.

Referring now to FIG. 7, FIG. 7 shows an example computing device 700 suitable for use in example systems or methods for native client takeover of browser-based communication sessions according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for intelligent diagnosis of network connectivity according to different examples, such as part or all of the example method 600 described above with respect to FIG. 6. In some embodiments, the computing device may include software 760 for executing one or more methods described herein, such as for example, one or more steps of method 600. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

joining, by a client device, a first communication session via a browser-based application associated with a third-party provider, wherein the browser-based application comprises at least one communication tool provided by a communication platform, wherein participants of the first communication session comprise a user associated with the client device and a first representative of the third-party provider;

receiving, by the client device, a request for a second communication session with the third-party provider;

in response to receiving the request, detecting, by the client device, whether a native communication application provided by the communication platform is installed on the client device;

in response to detecting the native communication application installed on the client device, providing, by the client device, a recommendation to establish the second communication session using the native communication application; and in response to receiving a selection of the recommendation, launching the native communication application to establish the second communication session, wherein participants of the second communication session comprise the user associated with the client device and a second representative of the third-party provider.

2. The method of claim 1, wherein the at least one communication tool comprises a software development kit provided by the communication platform.

3. The method of claim 1, wherein the recommendation is displayed in an interactive graphical user interface (GUI) element in a GUI of the client device, wherein the interactive GUI element comprises a popup message.

4. The method of claim 3, further comprising:

receiving a triggering signal from activation of a GUI button in the interactive GUI element, wherein the triggering signal comprises a customized connection protocol for establishing the second communication session.

5. The method of claim 1, further comprising:

detecting that the native communication application provided by the communications platform is not installed on the client device; and providing a second recommendation to install the native communication application on the client device and establish the second communication session using the native communication application.

6. The method of claim 1, wherein the second communication session is a different type from the first communication session on the browser-based application.

7. The method of claim 6, wherein the first communication session on the browser-based application is a chat session, and wherein the second communication session is a video conference session.

8. The method of claim 1, wherein the second communication session is of the same type as that of the first communication session on the browser-based application.

9. The method of claim 1, further comprising:

providing, by the client device, communication data associated with the first communication session to participants in the second communication session.

10. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

join a first communication session via a browser-based application associated with a third-party provider, wherein the browser-based application comprises at least one communication tool developed by a communication platform, wherein participants of the first communication session comprises a user associated with a client device and a first representative of the third-party provider;

receive a request for a second communication session;

in response to receiving the request, detect whether a native communication application provided by the communication platform is installed on the client device;

in response to detecting the native communication application installed on the client device, provide a recommendation to establish the second communication session using the native communication application; and in response to receiving a selection of the recommendation, launch the native communication application to establish the second communication session, wherein the second communication session is configured to include the user associated with the client device and a second representative of the third-party provider.

11. The system of claim 10, wherein the at least one communication tool comprises a software development kit provided by the communication platform.

12. The system of claim 10, wherein the recommendation is displayed in an interactive graphical user interface (GUI) element in a GUI of the client device, wherein the interactive GUI element comprises a popup message.

13. The system of claim 10, wherein the one or more processors are configured to execute further processor-executable instructions stored in the non-transitory computer-readable medium to:

detect that the native communication application provided by the communications platform is not installed on the client device; and provide a second recommendation to install the native communication application on the client device and establish the second communication session using the native communication application.

14. The system of claim 10, wherein the second communication session is a different type from the first communication session on the browser-based application.

15. The system of claim 14, wherein the first communication session on the browser-based application is a chat session, and wherein the second communication session is a video conference session.

16. The system of claim 10, wherein the second communication session is of the same type as that of the first communication session on the browser-based application.

17. A non-transitory computer-readable medium comprising processor-executable instructions configured to cause one or more processors to:

join a first communication session via a browser-based application associated with a third-party provider, wherein the browser-based application comprises at least one communication tool developed by a communication platform, wherein participants of the first communication session comprises a user associated with a client device and a first representative of the third-party provider;

receive a request for a second communication session;

in response to receiving the request, detect whether a native communication application provided by the communication platform is installed on the client device;

in response to detecting the native communication application installed on the client device, provide a recommendation to establish the second communication session using the native communication application; and in response to receiving a selection of the recommendation, launch the native communication application to establish the second communication session, wherein the second communication session is configured to include the user associated with the client device and a second representative of the third-party provider.

18. The non-transitory computer-readable medium of claim 17, wherein the at least one communication tool comprises a software development kit provided by the communication platform, wherein the recommendation is displayed in an interactive graphical user interface (GUI) element via a GUI of the client device, wherein the interactive GUI element comprises a popup message.

19. The non-transitory computer-readable medium of claim 17, further comprising processor-executable instructions configured to cause one or more processors to:

detect that the native communication application provided by the communications platform is not installed on the client device; and provide a second recommendation to install the native communication application on the client device and establish the second communication session using the native communication application.

20. The non-transitory computer-readable medium of claim 17, wherein the second communication session is a different type from the first communication session on the browser-based application, wherein the first communication session on the browser-based application is a chat session, and wherein the second communication session is a video conference session.

* * * * *